United States Patent
Ota et al.

(10) Patent No.: US 6,481,227 B1
(45) Date of Patent: Nov. 19, 2002

(54) AIR CONDITIONER

(75) Inventors: Masaki Ota; Masahiro Kawaguchi; Ken Suitou; Hirotaka Kurakake, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/699,879

(22) Filed: Oct. 30, 2000

(30) Foreign Application Priority Data

Nov. 1, 1999 (JP) ............................................ 11-311640

(51) Int. Cl.[7] .............................. F25B 41/00; F25B 1/00
(52) U.S. Cl. .......................................... 62/209; 62/228.3
(58) Field of Search ........................... 62/228.3, 228.5, 62/227, 209; 417/222.2

(56) References Cited

U.S. PATENT DOCUMENTS

| | | | |
|---|---|---|---|
| 4,300,357 A | 11/1981 | Jacyno | 62/239 |
| 4,537,042 A * | 8/1985 | Nishi et al. | 62/208 |
| 4,815,300 A * | 3/1989 | Suzuki | 62/227 X |
| 4,880,356 A | 11/1989 | Suzuki et al. | 417/53 |
| 5,285,648 A | 2/1994 | Bessler | 62/129 |
| 5,871,337 A | 2/1999 | Fukanuma et al. | 417/222.2 |

FOREIGN PATENT DOCUMENTS

| | | | | |
|---|---|---|---|---|
| JP | 406180155 | * | 6/1994 | 62/228.3 |
| JP | 7-294023 | | 11/1995 | |

* cited by examiner

Primary Examiner—William Wayner
(74) Attorney, Agent, or Firm—Morgan & Finnegan, LLP (57) ABSTRACT

An air conditioner having a refrigerant circuit that maintains a high cooling efficiency and a sufficient amount of oil returned to a compressor even if the flow rate of refrigerant is decreased due to a low cooling load is provided. The refrigerant circuit includes a condenser, an expansion valve, an evaporator and a variable displacement compressor. The expansion valve is normal-charge type. A control valve adjusts the pressure in a crank chamber based on the value of a current from a controller and on a pressure difference between two pressure monitoring points, which are located in the refrigerant circuit. Accordingly, the compressor displacement and the flow rate of refrigerant in the circuit are controlled.

13 Claims, 8 Drawing Sheets

AIR CONDITIONER

BACKGROUND OF THE INVENTION

The present invention relates to an air conditioner having a refrigerant circuit, which includes a condenser, an expansion valve, an evaporator and a variable displacement compressor.

A typical refrigerant circuit in a vehicle air-conditioning system includes a condenser, an expansion valve, an evaporator and a compressor. The compressor is driven by a vehicle engine. Thus, the compressor is preferably a variable displacement type, which draws, compresses and discharges refrigerant gas, the flow rate of which corresponds to the cooling load regardless of the engine speed. A typical commercialized variable displaced compressor is a variable displacement swash plate type compressor. A swash plate type compressor generally includes a swash plate located in a crank chamber and a displacement control valve. The compressor uses the control valve to change the pressure in the crank chamber to vary the displacement. The pressure at the outlet of the evaporator, which is referred to as pressure Ps' in this specification, represents the cooling load. The control valve adjusts the crank pressure to change the inclination angle of the swash plate to control the compressor displacement. Accordingly, the pressure at the evaporator outlet seeks a target suction pressure, or a pressure that represents a desired compartment temperature. The swash plate type compressor includes a swash plate supporting mechanism, which couples the swash plate to pistons and permits the swash plate to tilt. Lubricant oil is retained in the compressor and is converted to mist by gas circulating in the compressor. The oil mist is then supplied to locations where relative motion and contact occur between parts of the supporting mechanism. Some of the oil is also discharged from the compressor with gas through the crank chamber. The discharged oil is however returned to the compressor via the refrigerant circuit, which maintains a sufficient amount of oil in the crank chamber.

The evaporator receives refrigerant mist from the expansion valve and performs heat exchange between the mist and the air of the passenger compartment to cool the air. The refrigerant mist is heated and vaporized, however, insufficient vaporization has various disadvantages such as a reduction in the cooling efficiency. Thus, the refrigerant is preferably vaporized and superheated at the outlet of the evaporator. One of the basic functions of an expansion valve is to feedback control the flow rate of refrigerant supplied from the condenser to the evaporator such that the refrigerant at the evaporator outlet has a superheat (SH) of ten degrees centigrade maximum.

Figure 3:
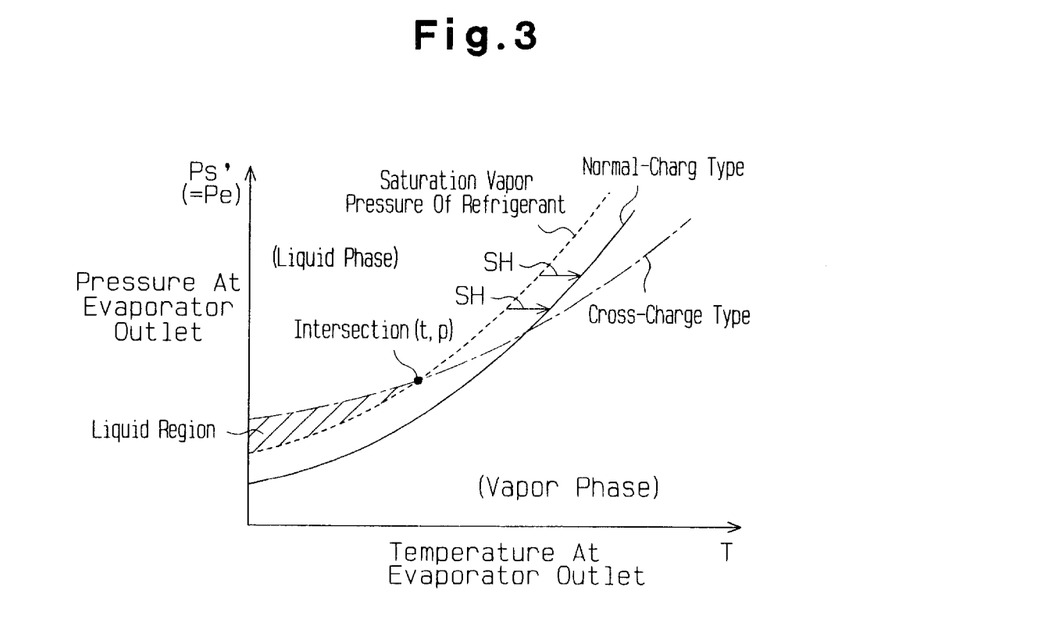
FIG. 3 is a graph showing pressure-temperature characteristics of different types of expansion valves.

A typical prior art variable displacement swash plate type compressor changes its displacement based on the pressure Ps' at the evaporator outlet. This type of compressor must be combined with a cross-charge type expansion valve and not with a normal-charge type expansion valve. A first broken line, which is formed by short dashes, in the graph of FIG. 3 represents the saturation vapor pressure characteristics of refrigerant. A cross-charge type expansion valve modifies the characteristics of the refrigerant to those represented by a second broken line, which is formed by long and short dashes. The first broken line and the second broken line intersect at a point (t, p). If the cross-charge type expansion valve is used, the characteristics are shifted to higher pressures from the original saturation vapor pressure characteristics line (the first broken line), and no superheat is present, in the range of temperatures and pressure that are lower than the point (t, p). In this state, refrigerant is liquefied at the outlet of the expansion valve. A normal-charge type expansion valve modifies the characteristics of the refrigerant to those shown by the solid line. The normal-charge type expansion valve superheats the refrigerant in the entire pressure and temperature range. Thus, if the normal-charge type expansion valve is used, refrigerant is always gasified at the outlet of the expansion valve.

Conventionally, the swash plate type compressor, which varies its displacement, is used together with a cross-charge type expansion valve. This is because the flow rate of lubricant that is returned to the compressor via the refrigerant circuit must always be equal to or greater than a certain level. Specifically, when the temperature T and the pressure Ps' of the refrigerant at the outlet of an evaporator are high due to a high cooling load, the expansion valve increases the flow rate of refrigerant in the refrigerant circuit, and the displacement control valve increases the compressor displacement. If the flow rate of refrigerant in the circuit is greater than a certain level, lubricant is reliably returned to the compressor and, in this state, the type of the expansion valve does not matter. However, when the temperature T and the pressure Ps' of the refrigerant at the outlet of the evaporator are low due to a small cooling load, the expansion valve decreases the flow rate of the refrigerant in the circuit, and the displacement control valve decreases the compressor displacement. If a normal-charge type expansion valve is used, the flow rate of refrigerant from the outlet of the evaporator to the compressor is limited, and the refrigerant carries a small amount of lubricant oil. Thus, if the low cooling load state is extended, the amount of oil discharged from the compressor will surpass the amount of oil returned to the compressor, which will deplete the oil in the compressor. This is why a cross-charge type expansion valve is typically used for a refrigerant circuit. When the cooling load is low, or the temperature at the outlet of the evaporator is lower than that of the intersection point (t, p), liquefied refrigerant, which contains lubricant oil, is returned to the compressor from the evaporator.

However, returning liquefied refrigerant to the compressor from the evaporator degrades the cooling efficiency. When liquefied refrigerant is returned to the compressor, less of the energy used to drive the compressor is used for cooling. In other words, more of the energy that drives the compressor is used for just circulating liquefied refrigerant in the refrigerant circuit, not for the heat exchange. If a cross-charge type expansion valve is used, the super heat SH increases as the temperature and the pressure at the outlet of the evaporator are increased. Therefore, it is difficult to maintain an appropriate degree of superheating. Further, cross-charge type expansion valves are generally more costly than normal-charge type expansion valves. Thus, it has been considered desirable to avoid using a cross-charge type expansion valve in a refrigerant circuit whenever possible.

SUMMARY OF THE INVENTION

Accordingly, it is an objective of the present invention to provide an air conditioner, which includes a variable displacement compressor, that maintains a high cooling efficiency and returns a certain amount of oil to the compressor even if the flow rate of refrigerant is decreased due to a low cooling load. Another objective is to overcome disadvantages that accompany a cross-charge type expansion valve.

To achieve the foregoing and other objectives and in accordance with the purpose of the present invention, an air conditioner is provided. The air conditioner includes a refrigerant circuit, two pressure monitoring points and a displacement control device. The refrigerant circuit includes a condenser, a normal-charge type expansion valve, an evaporator and a variable displacement compressor. The pressure monitoring points located in the refrigerant circuit. The displacement control device determines a target difference of the pressure difference between the pressure monitoring points and feedback controls the displacement of the compressor such that the pressure difference between the pressure monitoring points seeks the target difference.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

One embodiment according to the present invention will now be described.

Refrigerant Circuit and Expansion Valve

Figure 1:
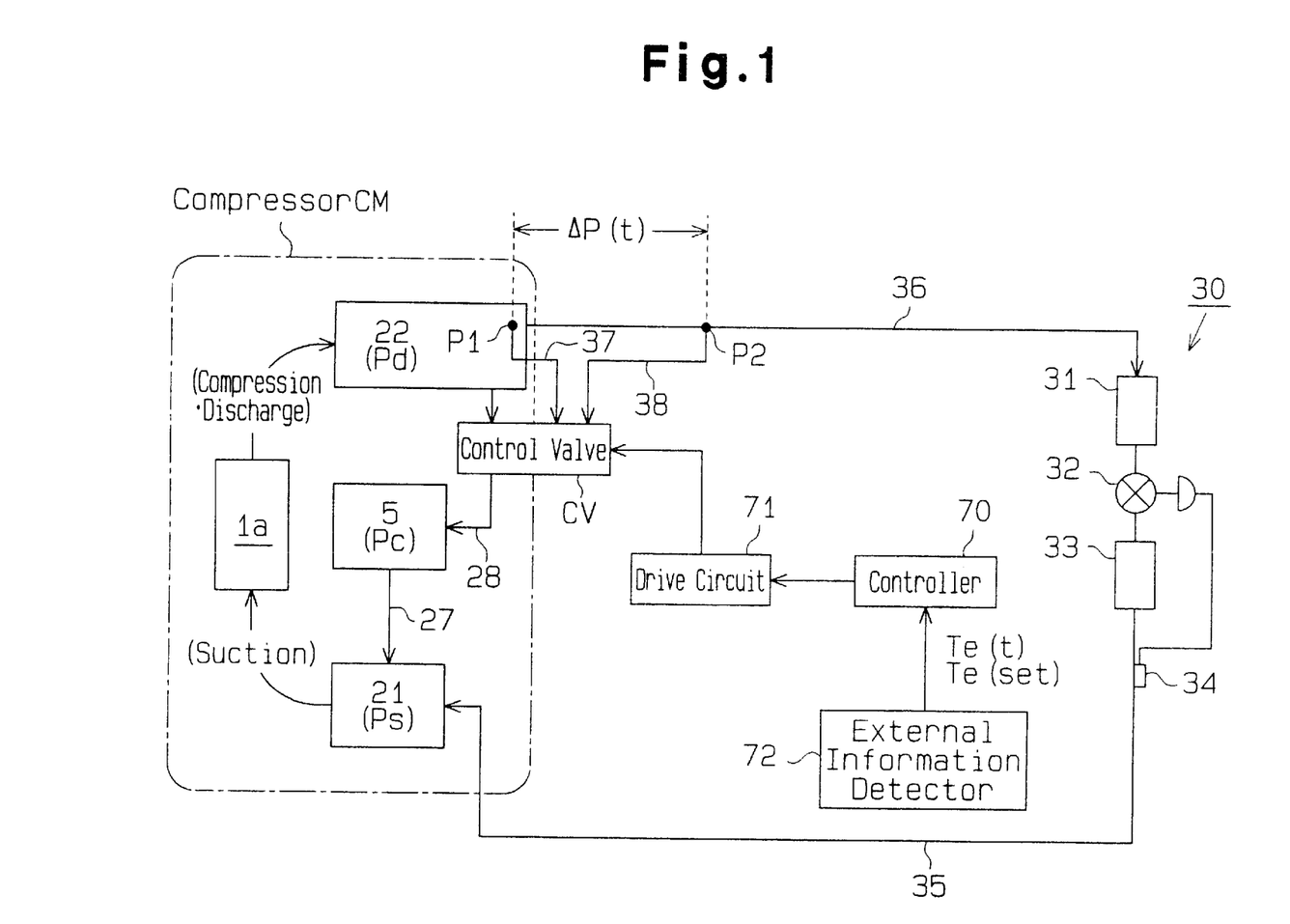
FIG. 1 is a schematic diagram illustrating a refrigeration circuit according to one embodiment.

As shown in FIG. 1, a refrigerant circuit (cooling circuit) of a vehicle air conditioner includes a variable displacement swash plate type compressor CM and an external refrigerant circuit 30. The external refrigerant circuit 30 includes, for example, a condenser 31, an expansion valve 32, an evaporator 33 and connecting pipes 35, 36. The pipe 35 connects the outlet of the evaporator 33 to a suction chamber 21 of the compressor CM. The pipe 36 connects a discharge chamber 22 of the compressor CM to the inlet of the condenser 31. The compressor CM draws refrigerant gas from the evaporator 33 through the pipe 35 into the suction chamber 21.

The compressor CM then compresses the gas and sends the gas to the discharge chamber 22. The pressurized gas in the discharge chamber 22 is discharged to the condenser 31 through the pipe 36.

The opening size of the expansion valve 32 is feedback-controlled based on the temperature and pressure of refrigerant detected by a heat sensitive tube 34 at the outlet of the evaporator 33. The expansion valve 32 supplies refrigerant, the amount of which corresponds to the cooling load, from the condenser 31 to the evaporator 33 to regulate the flow rate. The expansion valve 32 of FIG. 2 is a normal-charge type expansion valve.

Figure 2:
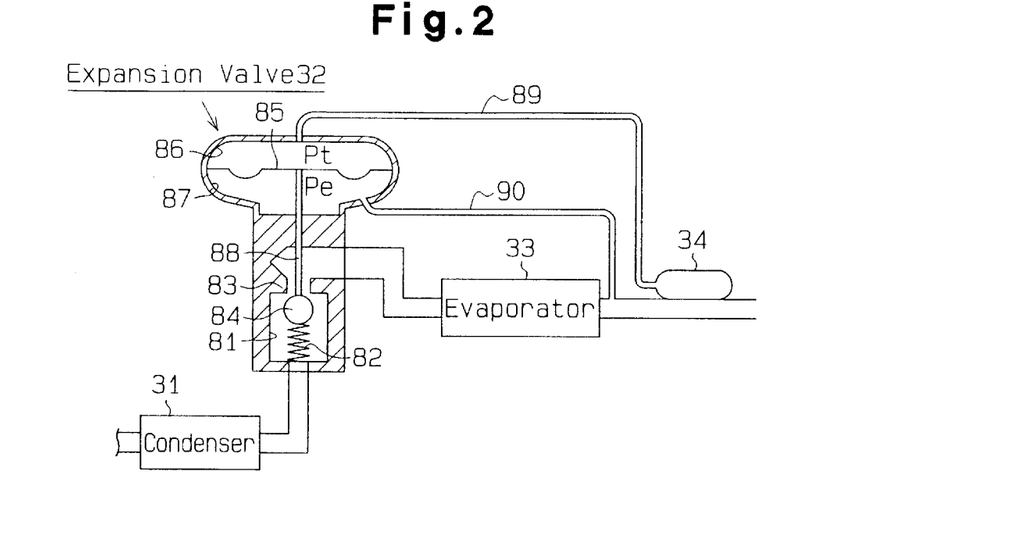
FIG. 2 is a cross-sectional view illustrating the normal-charge type expansion valve in the circuit of FIG. 1.

As shown in FIG. 2, the expansion valve 32 has a valve chamber 81, which forms part of a passage connecting the condenser 31 to the evaporator 33. A spring 82 and a valve body 84 are accommodated in the valve chamber 81, and a valve seat 83 is defined at a side connected to the evaporator 33. The spring 82 urges the valve body 84 toward the valve seat 83, or upward in the figure, to close the hole defined by the valve seat 83. A hollow is defined in the upper portion of the expansion valve 32. The hollow is divided by a pressure sensing member, which is a diaphragm 85 in this embodiment, into an upper first chamber 86 and a lower second chamber 87. The diaphragm 85 is connected to the valve body 84 by a rod 88. The first chamber 86 is connected to the heat sensitive tube 34 by a pipe 89. The second chamber 87 is connected to a part of the pipe 35 that is downstream of the evaporator 33, or to the outlet of the evaporator 33, by a pressure equalizing pipe 90. The second chamber 87 is filled with vapor of the same refrigerant that circulates in the refrigerant circuit (for example, alternative chlorofluorocarbon HFC-134a). The pressure in the second chamber 87 is equalized with the pressure Pe (Pe=Ps') at the outlet of the evaporator 33. The heat sensitive tube 34 is filled with a vapor and liquid mixture of the same refrigerant that circulates in the refrigerant circuit. The saturation vapor pressure Pt of the gas in the tube depends on the temperature of the evaporator 33. The pressure Pt is higher than the pressure Pe at the outlet of the evaporator 33 due to the influence of superheat SH. In other words, the pressure difference (Pt−Pe) represents the superheat SH. Thus, the position of the valve body 84, or the opening size of the expansion valve 32, is determined by the equilibrium of the downward force based on the pressure difference Pt−Pe and the force of the spring 82. As a result, the flow rate of the refrigerant is adjusted such that the refrigerant gas at the outlet of the evaporator 33 has a predetermined superheat SH.

Since the substance in the tube 34 is the same as the refrigerant that circulates in the refrigerant circuit, the expansion valve 32 is a normal-charge type expansion valve. The temperature at the outlet of the evaporator 33 (the temperature of the tube 34) and the pressure at the outlet of the evaporator 33 are represented by the solid line of FIG. 3. The solid line is offset from but otherwise matches the line of saturation vapor pressure of the refrigerant. The offset of the two lines along the temperature axis represents the superheat of the refrigerant gas at the outlet of the evaporator 33.In the entire range of the temperature and pressure of the refrigerant at the outlet of the evaporator 33, the characteristics line of the refrigerant is shifted toward the vapor phase side by the expansion valve 32. Therefore, the refrigerant at the evaporator outlet is always superheated vapor regardless of its flow rate.

Figure 4:
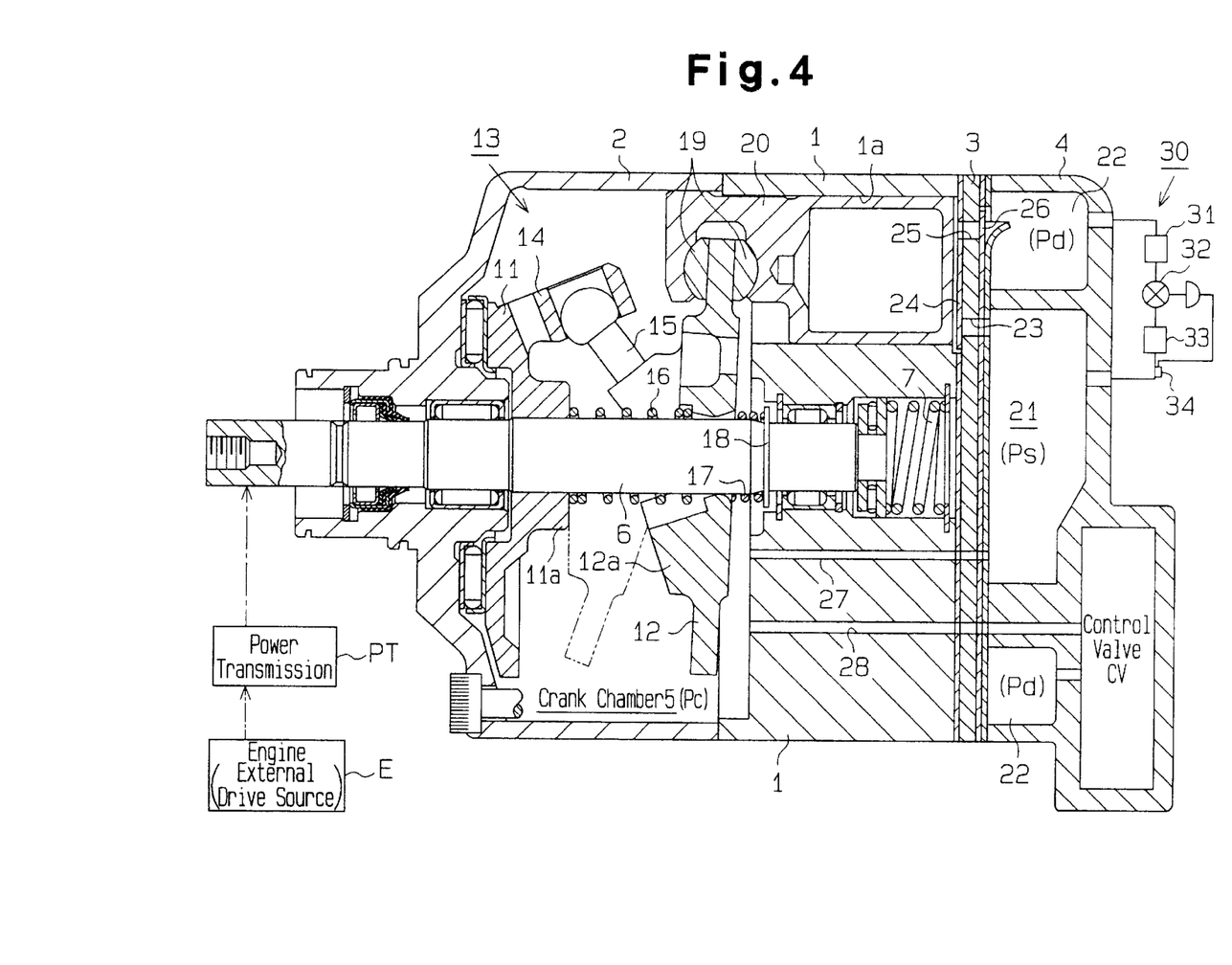
FIG. 4 is a cross-sectional view illustrating the variable displacement swash plate type compressor in the circuit of FIG. 1.

As shown in FIG. 4, the variable displacement swash plate type compressor CM has a cylinder block 1, a front housing member 2, which is secured to the front end face of the cylinder block 1, and a rear housing member 4, which is secured to the rear end face of the cylinder block 1. A valve plate 3 is located between the cylinder block 1 and the rear housing member 4. The cylinder block 1, the front housing member 2, the valve plate 3 and the rear housing member 4 are secured to one another to form the compressor housing. In FIG. 4, the left end of the compressor is defined as the front end, and the right end of the compressor is defined as the rear end. A crank chamber 5 is defined in the compressor housing. A drive shaft 6 extends through the crank chamber 5 and is supported. A lug plate 11 is secured to the drive shaft 6 in the crank chamber 5 to rotate integrally with the drive shaft 6. The drive shaft 6 and the lug plate 11 are urged forward by a spring 7. The front end of the drive shaft 6 is coupled to an external drive source, which is a vehicle engine E in this embodiment, by a power transmission PT, which is a clutchless mechanism in this embodiment. Specifically, the power transmission PT includes, for example, a belt and a pulley for constantly coupling the compressor CM with the engine E.

A cam plate, which is a swash plate 12 in this embodiment, is accommodated in the crank chamber 5. The swash plate 12 is coupled to the lug plate 11 and the drive shaft 6 by a hinge mechanism 13. The hinge mechanism 13 includes two support arms 14 (only one is shown) and two guide pins 15 (only one is shown). Each support arm 14 projects from the rear side of the lug plate 11. Each guide pin 15 projects from the front side of the swash plate 12. The support arms 14 and the guide pins 15 cooperate to permit the swash plate 12 to rotate integrally with the lug plate 11 and the drive shaft 6. The swash plate 12 has a hole formed in the center, through which the drive shaft 6 extends. Contact between the drive shaft 6 and the wall of the swash plate center hole permit the swash plate 12 to slide along the drive shaft 6 and tilt with respect to the axis of the drive shaft 6. A spring 16 is located between the lug plate 11 and the swash plate 12. The spring 16 urges the swash plate 12 toward the cylinder block 1, or in a direction decreasing the inclination angle θ of the swash plate 12. A stopper ring 18 is fixed on the drive shaft 6 behind the swash plate 12. A return spring 17 is fitted about the drive shaft 6 between the stopper ring 18 and the swash plate 12. When the inclination angle is great as shown by the broken line in FIG. 4, the spring 17 does not apply force to the swash plate 12. When the inclination angle θ is small as shown by the solid line in FIG. 4, the spring 17 is compressed between the stopper ring 18 and the swash plate 12 and urges the swash plate 12 away from the cylinder block 1, or in a direction increasing the inclination angle θ.

Cylinder bores la (only one shown) are formed in the cylinder block 1. A single headed piston 20 is reciprocally accommodated in each cylinder bore 1a. The front portion of each piston 20 is coupled to the swash plate 12 by a pair of shoes 19. Therefore, rotation of the swash plate 12 reciprocates each piston 20 by a stroke that corresponds to the inclination angle θ of the swash plate 12. A suction chamber 21 and a discharge chamber 22 are defined between the valve plate 3 and the rear housing member 4. The suction chamber 21 is located in the radial center of the rear housing member 4, and the discharge chamber 22 surrounds the suction chamber 21. The valve plate 3 has suction ports 23 and discharge ports 25, which correspond to each cylinder bore 1a. The valve plate 3 also has suction valve flaps 24, each of which corresponds to one of the suction ports 23, and discharge valve flaps 26, each of which corresponds to one of the discharge ports 25. Refrigerant gas is drawn from the outlet of the evaporator 33 to the suction chamber 21, or a zone of suction pressure Ps. When each piston 20 moves from the top dead center position to the bottom dead center position, refrigerant gas in the suction chamber 21 flows into the corresponding cylinder bore 1a via the corresponding suction port 23 and suction valve flap 24. When each piston 20 moves from the bottom dead center position to the top dead center position, refrigerant gas in the corresponding cylinder bore la is compressed to a predetermined pressure and is discharged to the discharge chamber 22, which is a zone of discharge pressure Pd, via the corresponding discharge port 25 and discharge valve 26.

Power of the engine E is transmitted to and rotates the drive shaft 6. Accordingly, the swash plate 12, which is inclined by an angle θ, is rotated. The angle θ is defined by the swash plate 12 and an imaginary plane that is perpendicular to the drive shaft 6. Rotation of the swash plate 12 reciprocates each piston 20 with a stroke that corresponds to the angle θ. As a result, suction, compression and discharge of refrigerant gas are repeated in the cylinder bores 1a.

The inclination angle θ of the swash plate 12 is determined according to various moments acting on the swash plate 12. The moments include a rotational moment, which is based on the centrifugal force of the rotating swash plate 12, a spring force moment, which is based on the force of the springs 16 and 17, a moment of inertia of the piston reciprocation, and a gas pressure moment. The gas pressure moment is generated by the force of the pressure in the cylinder bores 1a and the pressure in the crank chamber 5 (crank pressure Pc). Depending on the crank pressure Pc, the gas pressure moment acts either to increase or decrease the inclination angle θ of the swash plate 12. The gas pressure moment is adjusted by changing the crank pressure Pc by a displacement control valve CV, which will be discussed below. Accordingly, the inclination angle θ of the plate 12 is adjusted to an angle between the maximum inclination θmax and the minimum inclination θmin. The contact between a counterweight 12a on the swash plate 12 and a stopper 11a of the lug plate 11 prevents further inclination of the swash plate 12 from the maximum inclination θmax. The minimum inclination θmin is determined based primarily on the forces of the springs 16 and 17 when the gas pressure moment is maximized in the direction in which the swash plate inclination angle θ is decreased.

As described above, the crank pressure Pc is related to changes of the inclination angle θ of the swash plate 12. A mechanism for controlling the crank pressure Pc includes a bleed passage 27, a supply passage 28 and the control valve CV. The passages 27, 28 are formed in the compressor housing. The bleed passage 27 connects the suction chamber 21 with the crank chamber 5. The supply passage connects the discharge chamber 22 with the crank chamber 5. The control valve CV regulates the supply passage 28. Specifically, the opening of the control valve CV is automatically adjusted to control the flow rate of highly pressurized gas supplied to the crank chamber 5 through the supply passage 28. The crank pressure Pc is determined by the ratio of the gas supplied to the crank chamber 5 through the passage 28 and the flow rate of refrigerant gas relieved from the crank chamber 5 through the bleed passage 27. As the crank pressure Pc varies, the difference between the crank pressure Pc and the pressure in the cylinder bores 1a varies, which changes the inclination angle θ of the swash plate 12. Accordingly, the stroke of each piston 20, or the compressor displacement, is varied.

Flow rate of refrigerant and control valve

The greater the displacement of the compressor is, the higher the flow rate of refrigerant in the refrigeration circuit is. The greater the flow rate of the refrigerant is, the greater the pressure loss per unit length of the circuit is. That is, the pressure loss between two points in the refrigeration circuit corresponds to the flow rate of refrigerant in the circuit. Detecting the pressure difference ΔP(t) between two points P1,P2permits the displacement of the compressor to be indirectly detected. In this embodiment, two pressure monitoring points P1,P2 are defined in the pipe 36. The first pressure monitoring point P1 is located in the discharge chamber 22, which is the most upstream section of the pipe 36. The second pressure monitoring point P2 is located in the pipe 36 and is spaced from the first point P1 by a predetermined distance. A part of the control valve CV is exposed to the pressure PdH, or the discharge pressure Pd, at the first point P1 by a first passage 37. Another part of the control valve CV is exposed to a pressure PdL at the second point P2 by a second passage 38. The control valve CV mechanically detects the pressure difference ΔP(t)(ΔP(t)=(PdH−PdL)). The opening size of the control valve CV is automatically adjusted based on the pressure difference ΔP(t) to feedback control the compressor displacement.

Figure 5:
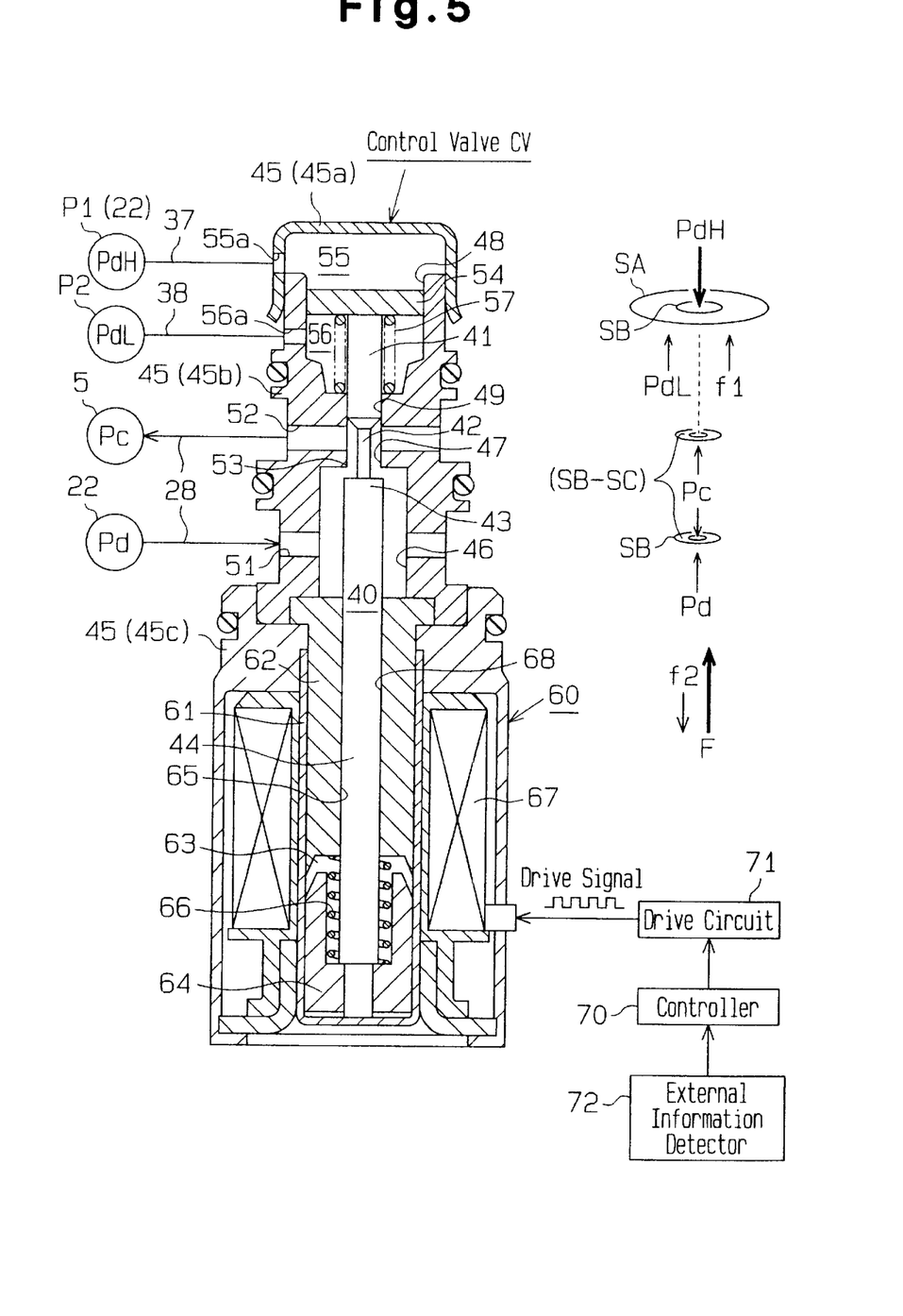
FIG. 5 is a cross-sectional view illustrating the control valve in the compressor of FIG. 4.

As shown in FIG. 5, the control valve CV includes an inlet valve portion and a solenoid 60. The inlet valve portion is arranged in an upper portion of the valve CV, while the solenoid 60 is arranged in a lower portion of the valve CV. The inlet valve portion adjusts the opening size (throttle amount) of the supply passage 28, which connects the discharge chamber 22 to the crank chamber 5. The solenoid 60 is an electromagnetic actuator for urging a rod 40 located in the control valve CV based on current supplied from an outside source. The solenoid 60 also changes the target value of the pressure difference ΔP(t). The rod 40 includes a distal portion 41, a coupler portion 42 and a proximal guide portion 44. The distal portion 41 receives the pressure difference ΔP(t). The guide portion 44 includes a valve body 43, which is located in the center of the rod 40. The cross-sectional area and the diameter of the distal portion 41 are represented by SB and d1, respectively. The cross-sectional area and the diameter of the coupler portion 42 are represented by SC and d2, respectively. The area and the diameter of the guide portion 44 (the valve body 43) are represented by SD and d3. The areas and diameters satisfy the following inequalities SC<SB<SD and d2<d1<d3.

The control valve CV has a valve housing 45. The housing 45 includes a cap 45a and an upper portion 45b and a lower portion 45c. The cap 45a is fixed to the end of the upper portion 45b. The upper portion 45b defines the outer housing portion of the inlet valve portion. The lower portion 45c defines the outer housing portion of the solenoid 60. A valve chamber 46 and a communication passage 47 are formed in the upper portion 45b. A pressure sensing chamber 48 is defined between the upper portion 45b and the cap 45a. The rod 40 extends through the valve chamber 46, the communication passage 47 and the pressure sensing chamber 48. The rod 40 moves axially, or in the vertical direction as viewed in the drawing. The valve chamber 46 is connected to the communication passage 47 depending on the position of the rod 40. The communication passage 47 is disconnected from the pressure sensing chamber 48 by a wall, which is a part of the valve housing 45. A guide hole 49 is formed in the wall to receive the rod 40. The diameter of the guide hole 49 is equal to the diameter d1 of the distal portion 41. The communication passage 47 is connected to the guide hole 49, and the diameter of the communication passage 47 is equal to the diameter d1 of the rod 40. That is, the area of the communication passage 47 and the area of the guide hole 49 are equal to the area SB of the distal portion 41.

The bottom of the valve chamber 46 is formed by the upper surface of a fixed iron core 62. A Pd port 51 extends radially from the valve chamber 46. The valve chamber 46 is connected to the discharge chamber 22 through the Pd port 51 and the upstream section of the supply passage 28. A Pc port 52 radially extends from the communication passage 47. The communication passage 47 is connected to the crank chamber 5 through the downstream section of the supply passage 28 and the Pc port 52. Therefore, the Pd port 51, the valve chamber 46, the communication passage 47 and the Pc port 52 are formed in the control valve CV and form a part of the supply passage 28, which connects the discharge chamber 22 with the crank chamber 5. The valve body 43 of the rod 40 is located in the valve chamber 46. The diameter d1 of the communication passage 47 is greater than the diameter d2 of the coupler portion 42 and smaller than the diameter d3 of the guide portion 44. Thus, a step is formed between the valve chamber 46 and the communication passage 47. The step 53 functions as a valve seat 53, and the communication passage 47 functions as a valve hole. When the rod 40 is moved from the position of FIG. 5, or the lowermost position, to the uppermost position, at which the valve body 43 contacts the valve seat 53, the communication passage 47 is disconnected from the valve chamber 46. That is, the valve body 43 is an inlet valve body that controls the opening size of the supply passage 28.

A dividing member, which is a movable wall 54, is located in the pressure sensing chamber 48. The movable wall 54 divides the pressure sensing chamber 48 into a P1 pressure chamber 55 (first pressure chamber) and a P2 pressure chamber 56 (second pressure chamber). The movable wall 54 moves axially in accordance with the pressure difference between the P1 pressure chamber 55 and the P2 pressure chamber 56. The cross-sectional area SA of the movable wall 54 is greater than the cross-sectional area SB of the guide hole 49 (SB<SA). The P1 pressure chamber 55 is constantly connected to the discharge chamber 22, which is the upstream pressure monitoring point P1, by a P1 port 55a formed in the cap 45 a and the first passage 37. The P2 pressure chamber 56 is constantly connected to the second pressure monitoring point P2 through a P2 port 56a formed in the upper portion 45b and the second passage 38. The P1 pressure chamber 55 is exposed to the discharge pressure Pd, which is the pressure PdH. The P2 pressure chamber 56 is exposed to the pressure PdL at the second pressure monitoring point P2. The upper side of the movable wall 54 receives the pressure PdH and the lower side receives the pressure PdL. The distal portion 41 of the rod 40 is located in the P2 pressure chamber 56. The distal end of the distal portion 41 is coupled to the movable wall 54. A spring 57 is located in the P2 pressure chamber 56. The spring 57 urges the movable wall 54 toward the P1 pressure chamber 55.

The solenoid 60 includes a cup-shaped cylinder 61. The cylinder 61 is fitted into the fixed iron core 62. A solenoid chamber 63 is defined in the cylinder 61. A plunger, which is a movable iron core 64, is accommodated in the solenoid chamber 63. The iron core 64 moves axially. A guide hole 65 extends axially in the center of the fixed core 62. The guide hole 65 receives the guide portion 44 of the rod 40 such that the rod 40 moves axially. There is a space 68 between the guide hole 65 and the guide portion 44. The clearance 68 communicates the valve chamber 46 with the solenoid chamber 63. That is, like the valve chamber 46, the solenoid chamber 63 is exposed to the discharge pressure Pd. The proximal portion of the rod 40 is located in the solenoid chamber 63. The lower end of the guide portion 44 is fitted into a hole formed in the center of the movable iron core 64.

The movable iron core 64 is crimped to the guide portion 44. Thus, the movable core 64 moves integrally with the rod 40.

A spring 66 is located between the fixed core 62 and the movable core 64. The spring 66 urges the movable core 64 and the rod 40 such that the movable core 64 moves away from fixed core 62. The force f2 of the spring 66 is greater than the force of the spring 57. Therefore, the spring 66 functions as initializing device that returns the movable core 64 and the rod 40 to the lowest position, or the initial position, when the electric current is not supplied. A coil 67 is wound about the fixed core 62 and the movable core 64. The coil 67 receives drive signals from a drive circuit 71 based on commands from a controller 70. The coil 67 generates an electromagnetic force F that corresponds to the value of the current from the drive circuit 71. The electromagnetic force F urges the movable core 64 toward the fixed core 62, which lifts the rod 40. The current to the coil 67 may be varied in an analog fashion. Alternatively, the current may be duty controlled, that is, the duty ratio Dt of the current may be controlled. In this case, a greater duty ratio Dt represents a smaller opening size of the control valve CV and a smaller duty ratio Dt represents a greater opening size of the control valve CV.

Operating conditions and characteristics of control valve

The opening size of the control valve CV is determined by the position of the rod 40. The rod 40 has the valve body 43, which functions as an inlet valve body. Forces acting on several parts of the rod 40 will now be explained to describe the operating conditions and the characteristics of the control valve CV.

The upper surface of the distal portion 41 receives a downward force, which is the resultant of the force f1 of the spring 57 and the pressures acting on the upper and the lower sides of the movable wall 54. The pressure receiving area on the upper side of the wall 54 is represented by SA. The pressure receiving area of the lower side of the wall 54 is represented by (SA−SB). The pressure receiving area of the lower end of the distal portion 41 is represented by (SB−SC). The crank pressure Pc applies an upward force to the lower end of the distal portion 41. Assume downward forces have positive values. The sum ΣF1 of the forces acting on the distal portion 41 is represented by the following equation.

$$\Sigma F1 = PdH \cdot SA - PdL(SA - SB) - f1 - Pc(SB - SC) \quad \text{Equation I}$$

Figure 6:
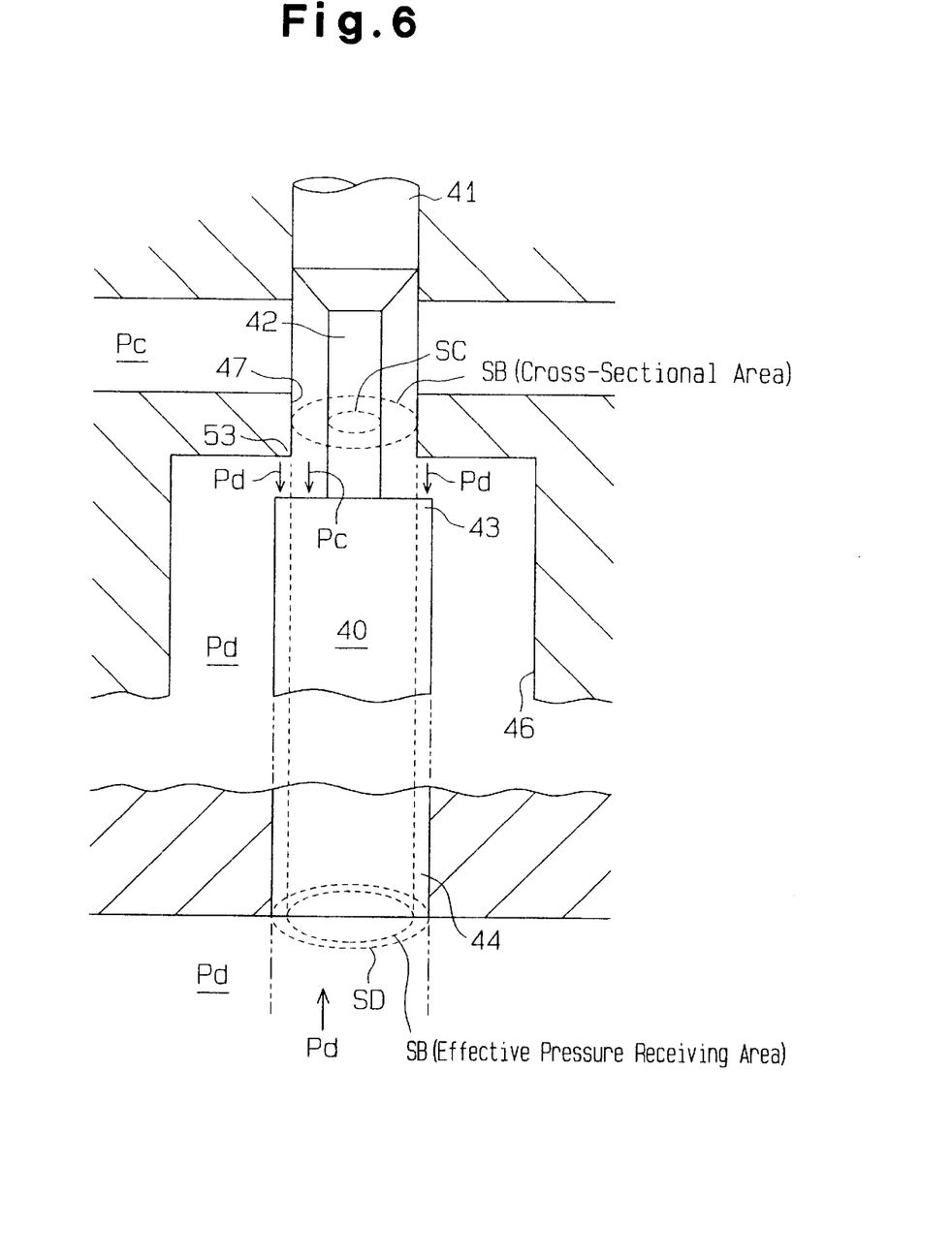
FIG. 6 is a schematic cross-sectional view showing an effective pressure receiving area of the control valve shown in FIG. 5.

A downward force f2 of the spring 66 and an upward electromagnetic force F act on the guide portion 44, which includes the valve body portion 43. The pressures that act on the exposed surfaces of the valve body 43, the guide portion 44 and the movable iron core 64 are simplified as follows. First, the upper end surface of the valve body 43 is divided into the inside section and the outside section by an imaginary cylindrical surface, which is shown by two broken lines in FIG. 6. The imaginary cylindrical surface corresponds to the inner peripheral surface of the communication passage 47. The crank pressure Pc acts downward on the inside section (area: SB−SC). The discharge pressure Pd acts downward on the outside section (area: SD−SB). Taking the pressure balance between the upper and lower surfaces of the movable iron core 64 into account, the discharge pressure Pd, to which the solenoid chamber 63 is exposed, acts on the area corresponding to the cross-sectional area SD of the guide portion 44 to urge the guide portion 44 upward. If the total force ΣF2 that acts on the valve body 43 and the guide portion 44, defining the upward direction as the positive direction, are summed, ΣF2 is expressed by the following equation II.

$$\Sigma F2 = F - f2 - Pc(SB - SC) - Pd(SD - SB) + Pd \cdot SD \quad \text{Equation II}$$
$$= F - f2 - Pc(SB - SC) + Pd \cdot SB$$

In the process of calculating equation II, −Pc·SD was canceled by +Pc·SD, and the term Pc·SB remained. As far as the discharge pressure Pd is concerned, the effective pressure receiving area of the guide portion 44 is equal to the cross-sectional area SB of the communication passage 47 regardless of the cross-sectional area SD of the guide portion 44. When pressures of the same kind act on both ends of a member such as a rod, the pressure receiving area having an effect that is not canceled is called the "effective pressure receiving surface area".

Since the rod 40 is an integrated member formed by connecting the distal portion 41 to the guide portion 44 by the coupler portion 42, its position is determined by the physical balance of ΣF1=ΣF2. In the equation ΣF1=ΣF2, the terms Pc(SB−SC) can be canceled. As a result, the following equation III is obtained.

$$(PdH - PdL)SA - Pd \cdot SB + PdL \cdot SB = F + f1 - f2 \quad \text{Equation III}$$

Since the first pressure monitoring point P1 is located in the discharge chamber 22, the pressure Pd is equal to the pressure PdH (Pd=PdH). If Pd is substituted by PdH, the equation III is converted into the following equations IV and V.

$$(PdH - PdL)SA - (PdH - PdL)SB = F + f1 - f2 \quad \text{Equation IV}$$
$$PdH - PdL = (F + f1 - f2)/(SA - SB) \quad \text{Equation V}$$

In equation V, f1, f2, SA and SB are fixed parameters that are primarily defined in the steps of mechanical design, and the electromagnetic force F is a variable parameter that changes in accordance with the power supplied to the coil 67. As apparent from equation V, the pressure difference ΔP(t), or PdH−PdL, is determined only by duty controlling the current supplied to the coil 67. That is, a target value TPD of the pressure difference is adjusted by externally controlling the control valve CV. Since the numerator of the right side of equation V is F+f1−f2, the target value of the pressure difference is determined by the solenoid 60 and the springs 57, 66. In other words, the solenoid 60 and the springs 57, 66 form a target pressure determining device. Equation V contains no pressure parameters such as the crank pressure Pc and the discharge pressure Pd other than the pressure difference (PdH−PdL). Thus, the crank pressure Pc and the discharge pressure Pd do not influence the position of the rod 40. In other words, pressure parameters other than the pressure difference do not affect the movement of the rod 40, and the control valve CV is regulated based only on the pressure difference ΔP(t), the electromagnetic force F and the spring forces f1, f2.

The opening size of the control valve CV is determined in the following manner. When no current is supplied to the coil 67, or when the duty ratio Dt is zero percent, the spring 66 positions the rod 40 at the lowest position shown in FIG. 5. The valve body 43 is spaced from the valve seat 53 by the greatest distance, which fully opens the control valve CV. When a current of the minimum duty ratio is supplied to the coil 67, the upward electromagnetic force F is greater than the downward force f2 of the spring 66. The net upward force (F−f2) generated by the solenoid 60 and the spring 66 acts against the net downward force of the pressure difference (PdH−PdL) and the spring 57. As a result, the position of the valve body 43 relative to the valve seat 53 is determined such that equation V is satisfied, which determines the opening size of the control valve CV. Accordingly, the flow rate of gas to the crank chamber 5 through the supply passage 28 is determined. Then, the crank pressure Pc is adjusted in accordance with the relationship between the flow rate of gas through the supply passage 28 and the flow rate of gas flowing out from the crank chamber 5 through the bleed passage 27. That is, controlling the opening size of the control valve CV controls the crank pressure Pc. When the electromagnetic force F is constant, the control valve CV functions as a constant flow rate valve and is actuated based on the target pressure difference TPD, which corresponds to the electromagnetic force F. However, since electromagnetic force F can be externally changed to adjust the target pressure difference TPD, the control valve CV can vary the displacement of the compressor.

Electronic System and Control

As shown in FIGS. 1 and 5, the vehicle air conditioner includes the controller 70, which controls the air conditioner. The controller 70 is a control unit similar to a computer which includes a CPU, a ROM, a RAM and an I/O interface. The output terminal of the I/O interface is connected to the drive circuit 71. The input terminal of the I/O interface is connected to an external information detection apparatus 72. The controller 70 computes an appropriate duty ratio Dt based on various external information provided from the detection apparatus 72 and commands the drive circuit 71 to output a driving signal having the computed duty ratio Dt. The drive circuit 71 outputs the instructed driving signal having the duty ratio Dt to the coil 67. In accordance with the duty ratio Dt of the driving signal provided to the coil 67, the electromagnetic force F of the solenoid 60 of the control valve CV is changed.

The external information detection apparatus 72 includes various sensors. The sensors of the detection apparatus 72 may include, for example, an A/C switch (ON/OFF switch of the air conditioner operated by a passenger), a temperature sensor for detecting the temperature Te (t) in the vehicle passenger compartment, a temperature adjuster for setting the desired temperature Te (set) in the passenger compartment, a vehicle speed sensor for detecting the vehicle speed V, an engine speed sensor for detecting the engine speed NE, and a throttle position sensor for detecting the opening size of a throttle located in the intake passage of the engine (none of which is separately shown). The throttle opening size is also used to present the degree of depression of the acceleration pedal in the vehicle. In this embodiment, the control valve CV, the controller 70, the drive circuit 71 and the external information detection apparatus 72 form a displacement control apparatus.

Next, the duty control by a controller 70 for the control valve CV will be described briefly with reference to FIGS. 7 and 8.

Figure 7:
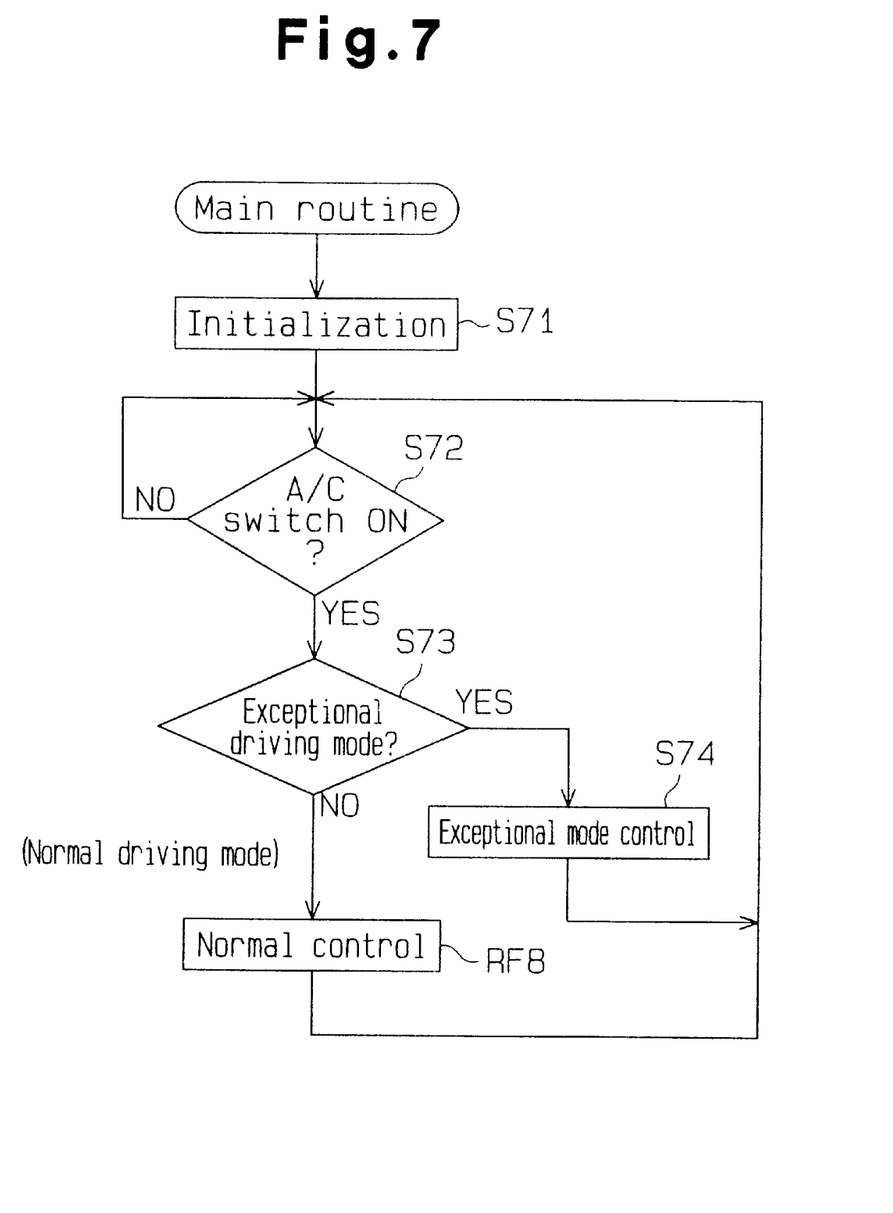
FIG. 7 is a flowchart of the main routine for controlling the displacement of the compressor shown in FIG. 4.

The flowchart of FIG. 7 shows the main routine of an air conditioning control program. When the vehicle ignition switch (or starting switch) is turned ON, the controller 70 receives power and starts processing. The controller 70 performs various initial setting in accordance with initial program in step S71 of FIG. 7. For example, an initial value or a provisional value is given to the duty ratio Dt. After that, the controller 70 executes a status monitoring procedure and a duty ratio computation procedure in steps from step S72.

In step S72, until the A/C switch is turned ON, the ON/OFF condition of the switch is monitored. When the A/C switch is turned ON, the controller 70 moves to step S73, or an exceptional driving mode determining routine. The exceptional driving mode refers to, for example, a case where the engine E is under high-load conditions such as when driving uphill or when accelerating rapidly (such as when passing another vehicle). In any case, by comparing the throttle opening size presented by the detection apparatus 72 with a predetermined value, the high load condition or vehicle acceleration state can be determined.

If the outcome of the step S73 is positive, that is, if the engine is in the exceptional driving mode, the controller 70 moves to step S74 for executing an exceptional mode procedure. In the exceptional mode procedure, the controller 70 maintains the duty ratio Dt at zero or at a minimum value Dt(min) for a predetermined period Δt after when the high load state or the acceleration state is detected. During the period Δt, the opening size of the control valve CV is maximized regardless of the pressure difference (PdH−PdL), which quickly increases the crank pressure Pc. Accordingly, the inclination angleθ of the swash plate 12 is quickly minimized, which minimizes the compressor displacement. This reduces the load on the engine E. More power is therefore available for moving the vehicle forward. During the period Δt, the cooling performance of the air conditioner is sacrificed. However, the period Δt is temporary and short. The passengers thus will not be disturbed.

If the current state is not determined to be one of the exceptional modes, the outcome of step S73 is negative. In this case, the vehicle is regarded to be in a steady state, that is, in a normal driving mode. In this specification, engine E is determined to be in the normal driving mode when an exclusive condition is satisfied. That is, when no monitoring condition in the exceptional driving mode determining routine is satisfied, the engine E is judged to be in the normal state. If the outcome of step S73 is negative, the controller 70 moves to a routine RF8. In most cases, the controller 70 returns to step S72 after executing the subroutine RF8.

Figure 8:
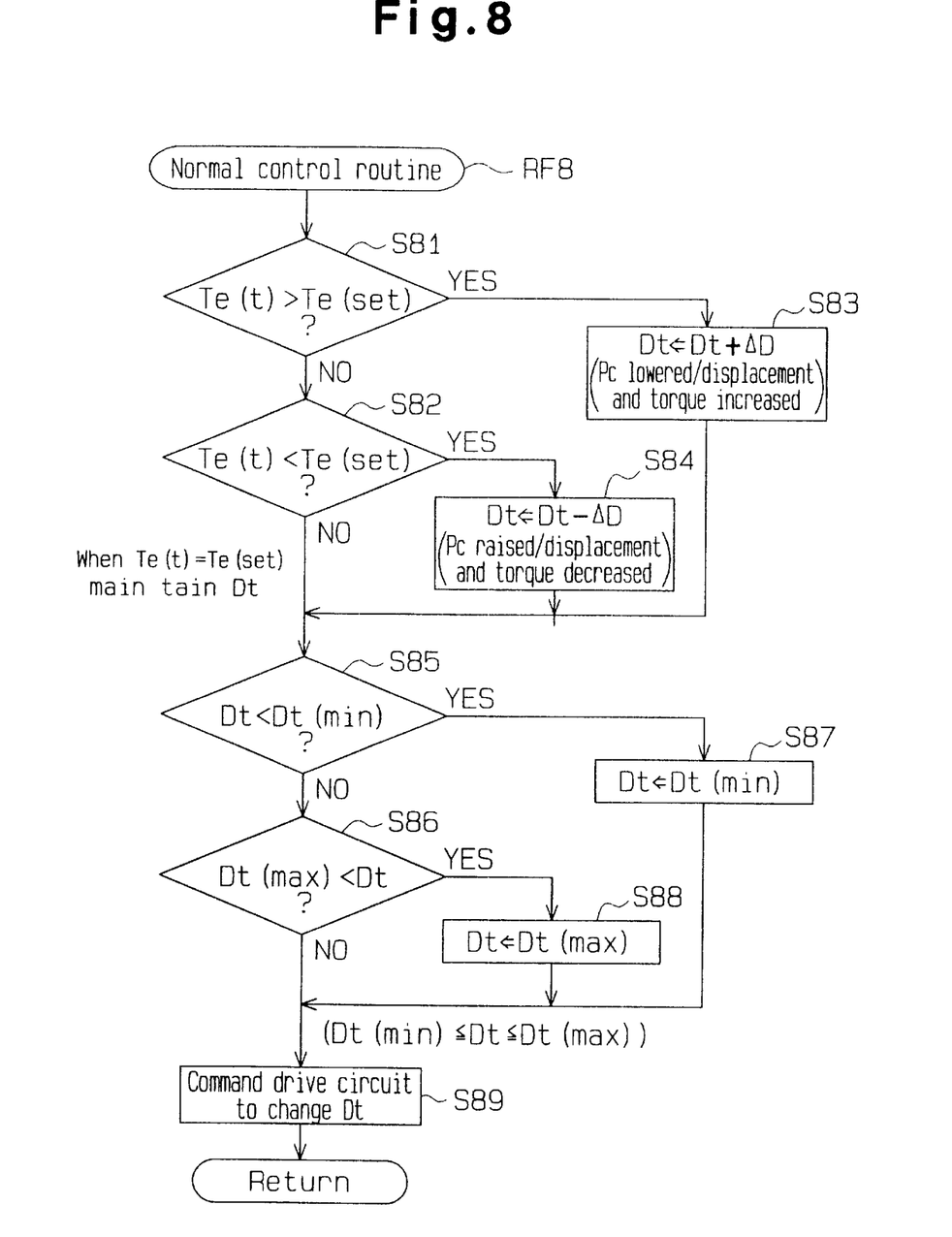
FIG. 8 is a flowchart of a normal control routine for controlling the displacement of the compressor shown in FIG. 4.

The subroutine RF8 of FIG. 8 is executed for feedback controlling the compressor displacement, or the air conditioning performance of the air conditioner, during the normal driving mode. The movable wall 54 of the control valve CV is used for detecting the pressure difference ΔP(t). The opening size of the control valve CV is mechanically feedback controlled in accordance with the pressure difference ΔP(t)(ΔP(t)=PdH−PdL). Therefore, in the routine RF8, the target pressure difference TPD is continuously adjusted according to the thermal load on the evaporator 33. That is, the duty ratio Dt is repeatedly corrected.

In step S81, the controller 70 judges whether the temperature Te(t) is higher than a desired temperature Te(set), which is set by the temperature adjuster. If the decision outcome of step S81 is negative, the controller 70 moves to step S82. In step S82, the controller 70 judges whether the temperature Te(t) is lower than the desired temperature Te(set). If the decision outcome in step S82 is also negative, the detected temperature Te(t) is equal to the desired temperature Te(set). Therefore, the cooling performance is not changed. Specifically, the target pressure difference TPD, or the duty ratio Dt, is not changed.

If the decision outcome of step S81 is positive, the passenger compartment temperature is expected to be high and the cooling load is expected to be great. Therefore, the controller 70 increases the duty ratio Dt by an amount ΔD in step S83. The increased duty ratio (Dt+ΔD) increases the electromagnetic force F of the solenoid 60, which increases the target pressure difference TPD. Since balance of the various forces on the rod 40 is not achieved by the pressure difference ΔP(t), the rod 40 is moved upward. Accordingly, more force is applied by the spring 66. Then, the position of the valve body 43 is determined such that equation V is satisfied with the downward force of the spring 66 and the increased upward electromagnetic force F. As a result, the opening size of the control valve CV, or the opening size of the supply passage 28, is slightly reduced, which lowers the crank pressure Pc. The pressure difference between the crank pressure Pc and the pressure in the cylinder bores 1a is reduced, which increases the inclination angle θ of the swash plate 12. This increases the compressor displacement and the load torque. As the compressor displacement is increased, the heat reduction performance of the evaporator 33 is increased, which will lower the temperature Te(t). The pressure difference ΔP(t) between the points P1 and P2 will increase. An increase in the pressure difference ΔP(t) causes the control valve CV to increase its opening size by a mechanical feedback.

When the outcome of S82 is positive, the vehicle compartment is cold and the cooling load is small. Therefore, in step S84, the controller 70 decreases the duty ratio Dt by a unit ΔD. When the duty ratio Dt is changed to a value (Dt−ΔD), the electromagnetic force F of the solenoid 60 is decreased and the target pressure difference of the control valve CV is decreased. Then, since balance between the forces on the rod 40 is not achieved with the current pressure difference ΔP(t), the rod 40 is moved downward, which reduces the force applied by the spring 66. Thus, the reduced downward force f2 of the spring 66 is countered by the reduced upward electromagnetic force F, and the valve body 43 is positioned such that equation V is satisfied again. As a result, the opening size of the control valve CV, that is, the opening size of the supply passage 28, is increased, which increases the crank pressure Pc. Accordingly, the difference between the crank pressure Pc and the pressure of the cylinder bores la increases, and the inclination angle θ of the swash plate 12 is decreased. Accordingly, the compressor displacement is decreased and the load torque is also decreased. When the discharge displacement of the compressor is decreased, the heat reduction performance of the evaporator 33 is also reduced, the temperature Te(t) is increased, and the pressure difference ΔP(t) between the points P1 and P2 is decreased. A decrease in the pressure difference ΔP(t) causes the opening size of the control valve CV to be reduced by mechanical feedback.

When the compartment temperature Te(t) is different from the desired temperature Te(set), the correction of the duty ratio Dt in steps S83 and/or S84 gradually optimizes the target pressure difference TPD and the opening size of the control valve CV is automatically feedback controlled. Accordingly, the temperature Te (t) seeks the desired temperature Te (set). In this embodiment, after executing steps S82, S83 or S84, the controller 70 confirms and corrects the duty ratio Dt in steps S85 to S88 such that the duty ratio Dt does not depart from a predetermined range.

At step S85, the controller 70 judges whether the corrected duty ratio Dt is lower than a predetermined minimum value Dt(min). If the outcome of step S85 is negative, the controller 70 moves to step S86. At step S86, the controller 70 judges whether the corrected duty ratio Dt is greater than a predetermined maximum value Dt(max). If the outcome of step S86 is also negative, the duty ratio Dt is in a permitted range and need not be corrected again.

If the outcome of step S85 is positive, the corrected duty ratio Dt is lower than the minimum value Dt(min). In this case, the controller 70 moves to step S87. At step S87, the controller 70 changes the duty ratio Dt to the minimum value Dt(min). If the outcome of step S86 is positive, the corrected duty ratio Dt is greater than the maximum value Dt(max). In this case, the controller 70 moves to step S88. At step S88, the controller 70 changes the duty ratio Dt to the maximum value Dt (max). After executing steps S86, S87 or S88, the duty ratio Dt will be in the range indicated by the inequality Dt(min)≦Dt≦Dt(max). Thereafter, at step S89, the controller 70 commands the drive circuit 71 to change the duty ratio Dt. Then the drive circuit 71 sends a drive signal of the corrected duty ratio Dt to the coil 67.

Figure 9:
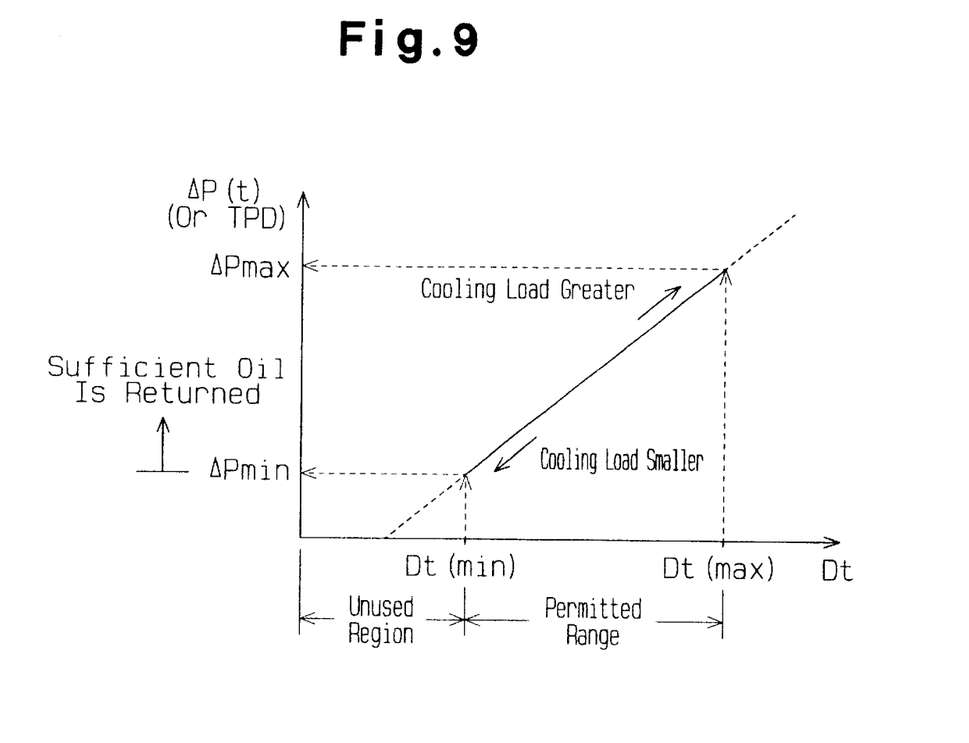
FIG. 9 is a graph illustrating the relationship between a duty ratio of current supplied to the solenoid of the control valve shown in FIG. 5 and a pressure difference at two different points in the refrigerant circuit shown in FIG. 1 during the normal control procedure.

The graph of FIG. 9 shows the relationship between the duty ratio Dt in the permitted range and the pressure difference ΔP(t) obtained by the duty ratio Dt or the target pressure difference TPD. Although the line of the relationship appears straight in FIG. 9 for convenience of description, the actual line is a gentle curve. As shown in FIG. 9, the minimum value ΔPmin and the maximum value ΔPmax of the pressure difference ΔP(t) correspond to the minimum value Dt(min) and the maximum value Dt(max) of the duty ratio Dt, respectively.

This embodiment is characterized by the procedure for determining the minimum value Dt(min) of the duty ratio Dt. The minimum value Dt(min) is determined such that vaporized refrigerant containing sufficient lubricant oil flows from the evaporator 33 to the compressor CM when the pressure difference is ΔPmin.

This embodiment has the following advantages.

The compressor displacement is feedback controlled based on the pressure difference ΔP(t) between the two pressure monitoring points P1 and P2. The expansion valve 32 in the external refrigerant circuit 30 is a normal-charge type. Thus, when the air conditioner is operating, vaporized refrigerant flowing from the outlet of the evaporator 33 to the compressor CM always contains a sufficient amount of oil for the compressor CM. Even if the cooling load is small and the temperature T and the pressure Ps' (Ps'=Pe) are relatively low, refrigerant is completely gasified at the outlet of the evaporator 33 and contains sufficient amount of lubricant oil. Also, the refrigerant is superheated by a relatively small degree at the evaporator outlet. Therefore, compared to prior art air conditioners, which use a cross-charge type expansion valve, the air conditioner according to the present invention has a higher cooling efficiency. Thus, a high cooling efficiency and an effective supply of oil to the compressor CM are achieved.

Since the normal-charge type expansion valve is used, the liquefied refrigerant is not returned to the compressor CM. Therefore, liquefied refrigerant is not supplied to and compressed in the cylinders 1a. Accordingly, the life of the compressor CM is extended.

In the above description, the minimum value Dt(min) of the duty ratio Dt is determined such that a sufficient amount of oil returns to the compressor CM. However, other factors may also be considered when determining the minimum value Dt(min). For example, the minimum value Dt(min) may be determined such that self-induced vibration of the suction valve flaps 24 is prevented when the compressor CM is operating with a small displacement. Also, the minimum value Dt(min) may be determined such that pulsation, or hunting, of refrigerant in the passages 35, 36 is prevented. This is because the control valve CV not only varies the compressor displacement but also directly controls the flow rate of refrigerant in the refrigerant circuit through the displacement control.

In the illustrated embodiment, the compressor displacement is feedback controlled by directly adjusting the pressure difference ΔP(t)(ΔP(t)=PdH−PdL) between the pressure monitoring points P1 and P2. Therefore, under the exceptional conditions, for example, when the engine speed needs to be increased, the compressor displacement is quickly and reliably decreased regardless of the thermal load on the evaporator 33. In the normal driving mode, the duty ratio Dt, which is used for changing the target pressure difference TPD, is corrected based on the compartment temperature Te(t) and the desired temperature Te(set). Also, the opening size of the control valve CV is controlled based on the pressure difference ΔP(t). The compressor displacement is controlled accordingly. Therefore, the compressor displacement is adjusted such that the compartment temperature Te(t) seeks the desired temperature Te(set), which makes the compartment comfortable for the passengers.

The compressor displacement is feedback controlled based on the pressure difference between the pressure monitoring points P1 and P2. That is, the pressure difference ΔP(t) seeks the target pressure difference TPD. The pressure difference ΔP(t) then corresponds to the desired compressor displacement. At this time, the flow rate of refrigerant in the refrigerant circuit corresponds to the target pressure difference TPD. Since the compressor displacement is controlled based on the pressure difference between the pressure monitoring points P1 and P2, the flow rate of the refrigerant in the refrigerant circuit can be freely controlled. The refrigerant at the outlet of the evaporator 33 is always in the vapor state since the expansion valve 32 is a normal-charge type. However, the flow rate of refrigerant is controlled such that a sufficient amount of lubricant oil is always returned to the compressor CM. That is, the flow rate of the vaporized refrigerant and the flow rate of lubricant oil are directly controlled such that the flow rate of the refrigerant does not fall below the minimum necessary value. Therefore, the drawbacks and disadvantages caused by using a cross-charge type expansion valve are eliminated, and the cooling efficiency is improved. Also, a sufficient amount of oil is continuously returned to the compressor.

The controller 70 commands the control valve CV to adjust the target pressure difference TPD based on external information. The control valve Cv controls the crank pressure Pc to adjust the compressor displacement such that the pressure difference ΔP(t) seeks the target pressure difference TPD. The control valve CV automatically controls the compressor displacement based on the target pressure difference TPD and the actual pressure difference ΔP(t). Thus, the computation load on the controller 70 is reduced.

It should be apparent to those skilled in the art that the present invention may be embodied in many other specific forms without departing from the spirit or scope of the invention. Particularly, it should be understood that the invention may be embodied in the following forms.

Other Embodiments

In the illustrated embodiment, the pressure monitoring points P1, P2 are located along the pipe 36, which connects the discharge chamber 22 to the condenser 31. However, the pressure monitoring points P1, P2 may be located along the pipe 35, which connects the evaporator 33 with the suction chamber 21. As in the illustrated embodiment, the flow rate of refrigerant and the compressor displacement are detected based on the pressure difference ΔP(t).

The expansion valve 32 may be any expansion valve as long as it is a normal-charge type, which constantly maintains a predetermined superheat SH. That is, as long as the expansion valve 32 is a normal-type expansion valve, it may be a gas-charge type, a liquid-charge type or an adsorbent-charge type.

The expansion valve 32 is not limited to an external pressure equalizing type, which has the pressure equalizing pipe 90, but may be an internal pressure equalizing type.

The refrigerant circuit in this embodiment refers to a circuit that includes the condenser 31, the expansion valve 32, the evaporator 33 and the compressor CM (the suction chamber 21, the cylinder bores 1a and the discharge chamber 22). The cylinder bores 1a, when they are in the suction and compression-discharge stroke, are included in the refrigerant circuit. On the other hand, the internal circuit in the compressor CM, which includes the crank chamber 5 to circulate the lubricant within the compressor CM, is not included in the refrigerant circuit.

Therefore, the present examples and embodiments are to be considered as illustrative and not restrictive and the invention is not to be limited to the details given herein, but may be modified within the scope and equivalence of the appended claims.

What is claimed is:

1. An air conditioner comprising:
a refrigerant circuit including a condenser, a normal-charge type expansion valve, an evaporator and a variable displacement compressor;
two pressure monitoring points located in the refrigerant circuit; and
a displacement control device, wherein the displacement control device determines a target difference of the pressure difference between the pressure monitoring points and feedback controls the displacement of the compressor such that the pressure difference between the pressure monitoring points seeks the target difference.

2. The air conditioner according to claim 1, wherein the displacement control device includes an external information detector for detecting various external information, wherein the detector includes a temperature sensor for obtaining information associated with the temperature of a passenger compartment and a temperature adjuster for setting a desired temperature, and wherein the displacement control device determines the target pressure difference based on a comparison between the temperature detected by the temperature sensor and the desired temperature set by the temperature adjuster.

3. The air conditioner according to claim 1, further comprising a heat sensitive tube, wherein the expansion valve includes a valve body, a pressure sensing member coupled to the valve body and first and second chambers, the first chamber being separated from the second chamber by the pressure sensing member, wherein the first chamber is connected to the heat sensitive tube and the second chamber is connected to the outlet of the evaporator, and wherein the first chamber and the heat sensitive tube and the second chamber are filled with the same type of refrigerant.

4. The air conditioner according to claim 1, wherein the compressor includes a cylinder bore, a discharge chamber, a suction chamber, a crank chamber and a cam plate located in the crank chamber, wherein the discharge chamber receives refrigerant that is compressed in the cylinder bore to send the compressed refrigerant to the condenser, the suction chamber receives refrigerant from the evaporator to send the refrigerant to the cylinder bore, wherein the displacement of the compressor is varied by adjusting the refrigerant pressure in the crank chamber, the displacement control device comprising:
a controller for determining the target pressure difference based on various external information; and
a control valve for adjusting the crank chamber pressure based on the target pressure difference.

5. The air conditioner according to claim 4, wherein the control valve includes a valve chamber located between the discharge chamber and the crank chamber, a first pressure chamber connected to one of the pressure monitoring points, a second pressure chamber connected to the other pressure monitoring points, a rod extending through the pressure sensing chamber and the valve chamber, and a solenoid, the solenoid having a movable iron core connected to one end of the rod, wherein the solenoid changes the target pressure difference based on determination of the controller.

6. The air conditioner according to claim 4, further comprising a refrigerant pipe for connecting the discharge chamber to the inlet of the condenser, and wherein one of the pressure monitoring points is located in the discharge chamber and the other point is located in the refrigerant pipe and is spaced from the first monitoring point by a predetermined distance.

7. The air conditioner according to claim 1, wherein the refrigerant contains lubricant oil, and wherein the displacement control device determines the pressure difference such that the flow rate of refrigerant flowing into the compressor carries at least a sufficient amount of lubricant oil for the compressor.

8. An air conditioner comprising:
 a refrigerant circuit including a condenser, a normal-charge type expansion valve, an evaporator and a variable displacement compressor;
 two pressure monitoring points located in the refrigerant circuit; and
 a displacement control device, wherein the displacement control device determines a target difference of the pressure difference between the pressure monitoring points and feedback controls the displacement of the compressor such that the pressure difference between the pressure monitoring points seeks the target difference, wherein the expansion valve adjusts the flow rate of refrigerant such that the temperature at the outlet of the evaporator has a predetermined superheat relative to tho saturation vapor pressure characteristics of the refrigerant.

9. An air conditioner comprising:
 a refrigerant circuit for circulating refrigerant containing oil, wherein the circuit includes a condenser, a normal-charge type expansion valve, evaporator and a variable displacement compressor, wherein the expansion valve adjusts the flow rate of refrigerant such that the temperature at the outlet of the evaporator has a predetermined superheat relative to the saturation vapor pressure characteristics of the refrigerant, wherein the compressor includes a cylinder bore, a discharge chamber, a suction chamber, a crank chamber, a cam plate located in the crank chamber and a control valve for adjusting the refrigerant pressure in the crank chamber, wherein the discharge chamber receives refrigerant that is compressed in the cylinder bore to send the compressed refrigerant to the condenser, the suction chamber receives refrigerant from the evaporator to send the refrigerant to the cylinder bore, wherein the displacement of the compressor is varied by adjusting the refrigerant pressure in the crank chamber by the control valve, wherein the refrigerant circuit includes a refrigerant pipe for connecting the discharge chamber to the inlet of the condenser, the air conditioner further comprising:
 two pressure monitoring points located in the refrigerant circuit, wherein one of the pressure monitoring points is located in the discharge chamber and the other point is located in the refrigerant pipe and is spaced from the first monitoring point by a predetermined distance; and
 a controller for determining a target pressure difference of the pressure difference between the pressure monitoring points based on various external information, wherein the control valve automatically feedback controls the displacement of the compressor such that the pressure difference between the pressure monitoring points seeks the target pressure difference.

10. The air conditioner according to claim 9, further comprising a heat sensitive tube, wherein the expansion valve includes a valve body, a pressure sensing member coupled to the valve body and first and second chambers, the first chamber being separated from the second chamber by the pressure sensing member, wherein the first chamber is connected to the heat sensitive tube and the second chamber is connected to the outlet of the evaporator, and wherein the first chamber and the heat sensitive tube and the second chamber are filled with the same type of refrigerant.

11. The air conditioner according to claim 9, wherein the control valve includes a valve chamber located between the discharge chamber and the crank chamber, a first pressure chamber connected to one of the pressure monitoring points, a second pressure chamber connected to the other pressure monitoring points, a rod extending through the pressure sensing chamber and the valve chamber, and a solenoid, the solenoid having a movable iron core connected to one end of the rod, wherein the solenoid changes the target pressure difference based on determination of the controller.

12. The air conditioner according to claim 9, wherein the refrigerant contains lubricant oil, and wherein the displacement control device determines the pressure difference such that the flow rate of refrigerant flowing into the compressor carries at least a sufficient amount of lubricant oil for the compressor.

13. The air conditioner according to claim 9, wherein the displacement control device includes an external information detector for detecting various external information, wherein the detector includes a temperature sensor for obtaining information associated with the temperature of a passenger compartment and a temperature adjuster for setting a desired temperature, and wherein the displacement control device determines the target pressure difference based on a comparison between the temperature detected by the temperature sensor and the desired temperature set by the temperature adjuster.

* * * * *

UNITED STATES PATENT AND TRADEMARK OFFICE
CERTIFICATE OF CORRECTION

PATENT NO. : 6,481,227 B1
DATED : November 19, 2002
INVENTOR(S) : Masaki Ota et al.

It is certified that error appears in the above-identified patent and that said Letters Patent is hereby corrected as shown below:

Column 15,
Line 38, please delete "Cv" and insert -- CV --

Signed and Sealed this

Fourth Day of March, 2003

JAMES E. ROGAN
*Director of the United States Patent and Trademark Office*